(12) United States Patent
Garvey et al.

(10) Patent No.: US 9,931,706 B2
(45) Date of Patent: Apr. 3, 2018

(54) ADJUSTABLE DRIVE SHAFT ASSEMBLY

(71) Applicant: Illinois Tool Works Inc., Glenview, IL (US)

(72) Inventors: Paul William Garvey, Kaukauna, WI (US); Benjamin David Romenesko, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 316 days.

(21) Appl. No.: 13/797,301

(22) Filed: Mar. 12, 2013

(65) Prior Publication Data
US 2014/0263255 A1   Sep. 18, 2014

(51) Int. Cl.
*B23K 9/10*  (2006.01)
*B23K 9/12*  (2006.01)
*B23K 9/133*  (2006.01)

(52) U.S. Cl.
CPC .............. *B23K 9/124* (2013.01); *B23K 9/133* (2013.01); *B23K 9/1336* (2013.01)

(58) Field of Classification Search
CPC ............... B23K 9/12; B23K 9/28; B23K 9/32
USPC ....... 219/137.2, 137.7, 137.63; 226/181, 182
See application file for complete search history.

(56) References Cited

U.S. PATENT DOCUMENTS

| | | | |
|---|---|---|---|
| 1,873,326 A | 8/1932 | Ratigan | |
| 3,055,591 A | 9/1962 | Shepard | |
| 3,062,569 A * | 11/1962 | Westermeier | F16B 21/12 403/354 |
| 3,199,644 A | 8/1965 | Clapp | |
| 3,203,268 A * | 8/1965 | Manoni | F16D 7/025 403/256 |
| 3,734,369 A | 5/1973 | Johnson | |
| 4,527,037 A | 7/1985 | Johnson | |
| 4,703,156 A | 10/1987 | Hayes | |
| 4,902,162 A * | 2/1990 | Watt | F16D 1/0894 403/318 |
| 4,954,690 A | 9/1990 | Kensrue | |

(Continued)

FOREIGN PATENT DOCUMENTS

| | | |
|---|---|---|
| CN | 201881037 | 6/2011 |
| CN | 202963749 | 6/2013 |

(Continued)

OTHER PUBLICATIONS

International Search Report from PCT application No. PCT/US2014/017224, dated Aug. 12, 2014, 8 pgs.

(Continued)

*Primary Examiner* — Dana Ross
*Assistant Examiner* — Ayub Maye
(74) *Attorney, Agent, or Firm* — McAndrews, Held & Malloy, Ltd.

(57) ABSTRACT

A welding system includes a welding wire feeder, and the welding wire feeder includes a motor and an adjustable drive shaft assembly. The motor is and configured to rotate a feed roll with respect to the wire drive assembly housing. The adjustable drive shaft assembly is coupled to the motor and configured to couple with the feed roll. The adjustable drive shaft assembly includes a drive mechanism configured to urge rotation of the feed roll and to adjust a position of the feed roll relative to the wire drive assembly housing.

20 Claims, 5 Drawing Sheets

(56) References Cited

U.S. PATENT DOCUMENTS

| | | | |
|---|---|---|---|
| 5,249,760 A * | 10/1993 | Morimoto | A01K 89/01 242/279 |
| 5,410,126 A | 4/1995 | Miller | |
| 5,816,466 A | 10/1998 | Seufer | |
| 6,286,748 B1 | 9/2001 | Cooper | |
| 6,388,234 B1 | 5/2002 | Collins | |
| 6,427,894 B1 | 8/2002 | Blank | |
| 6,536,644 B2 * | 3/2003 | Plow | 226/190 |
| 6,557,742 B1 * | 5/2003 | Bobeczko et al. | 226/186 |
| 6,568,578 B1 * | 5/2003 | Kensrue | 226/176 |
| 7,244,909 B2 | 7/2007 | Kensrue | |
| 7,301,124 B2 | 11/2007 | Kaufman | |
| 7,374,074 B2 * | 5/2008 | Matiash | 226/182 |
| 7,615,723 B2 | 11/2009 | Matiash | |
| 7,767,934 B2 | 8/2010 | Christopher | |
| 7,977,604 B2 * | 7/2011 | Ertmer | 219/137.2 |
| 2002/0130153 A1 | 9/2002 | Plow | |
| 2003/0015510 A1 | 1/2003 | Wakeman | |
| 2005/0016976 A1 | 1/2005 | Belfiore | |
| 2005/0040202 A1 | 2/2005 | Kerekes | |
| 2005/0224486 A1 | 10/2005 | Matiash | |
| 2006/0219683 A1 | 10/2006 | Kensrue | |
| 2006/0278623 A1 | 12/2006 | Christopher | |
| 2009/0277890 A1 | 11/2009 | Leiteritz | |
| 2011/0220628 A1 | 9/2011 | Mehn | |
| 2012/0152924 A1 | 6/2012 | Christopher | |
| 2012/0152926 A1 | 6/2012 | Matiash | |
| 2012/0248084 A1 | 10/2012 | Romenesko | |
| 2013/0035192 A1 | 2/2013 | Hayashi | |

FOREIGN PATENT DOCUMENTS

| | | |
|---|---|---|
| DE | 20113852 | 11/2001 |
| EP | 1577245 A2 | 9/2005 |
| EP | 2476500 | 7/2012 |
| GB | 1093736 | 12/1967 |
| WO | 0128728 | 4/2001 |
| WO | 03022501 A2 | 3/2003 |
| WO | 2008018960 | 2/2008 |
| WO | 2008018961 | 2/2008 |
| WO | 2013033849 | 3/2013 |

OTHER PUBLICATIONS

U.S. Appl. No. 13/939,949, filed Jul. 11, 2013, John Michael Patterson.

U.S. Appl. No. 13/523,577, filed Jun. 14, 2012, Paul William Garvey.

International Search Report from PCT application No. PCT/US2014/045166, dated Nov. 5, 2014, 10 pgs.

International Search Report from PCT application No. PCT/US2013/045280 dated Oct. 18, 2013, 9 pgs.

* cited by examiner

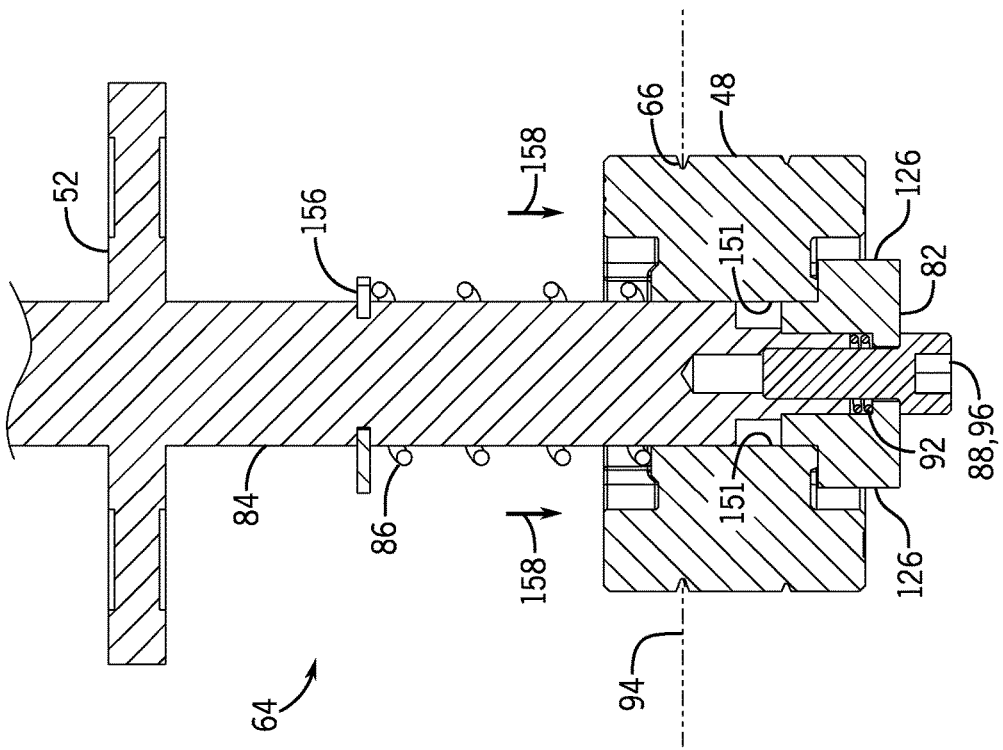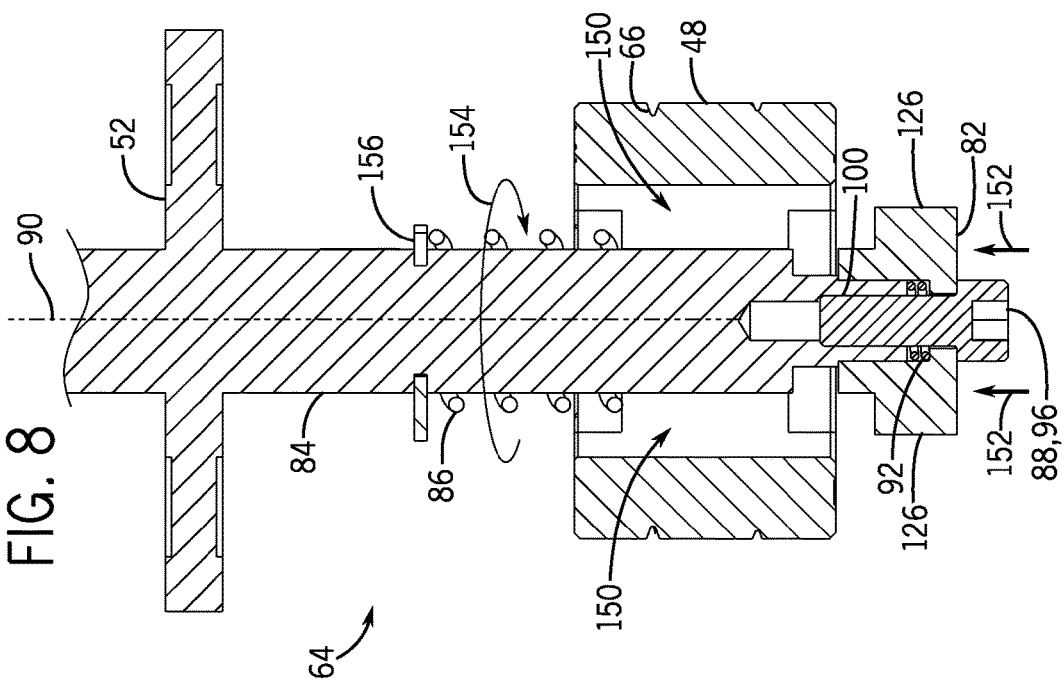

ADJUSTABLE DRIVE SHAFT ASSEMBLY

BACKGROUND

The invention relates generally to welding systems and, more particularly, to an adjustable drive shaft assembly for use in welding wire feeders.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at a desired time. For example, metal inert gas (MIG) welding typically relies on a wire feeder to ensure a proper wire feed reaches a welding torch.

Such wire feeders facilitate the feeding of welding wire from a wire spool, through a pair of feed rolls, to the welding torch at a desired wire feed rate. The feed rolls include grooves designed to hold the welding wire in position as it is conveyed between the feed rolls and through the wire feeder. To facilitate smooth feeding of the welding wire, the feed rolls are generally located in the wire feeder such that the grooves of each of the feed rolls are aligned with each other. Unfortunately, machine tolerances in the feed rolls and other wire feeder components may lead to misalignment of the feed roll grooves and, therefore, misalignment of the welding wire moving through the wire feeder.

BRIEF DESCRIPTION

In a first embodiment, a welding system includes a welding wire feeder, and the welding wire feeder includes a motor and an adjustable drive shaft assembly. The motor is configured to rotate a feed roll with respect to a wire drive assembly housing. The adjustable drive shaft assembly is coupled to the motor and configured to couple with the feed roll. The adjustable drive shaft assembly includes a drive mechanism configured to urge rotation of the feed roll and to adjust a position of the feed roll relative to the wire drive assembly housing.

In another embodiment, a welding wire feeder includes a wire drive assembly housing and a motor disposed adjacent the wire drive assembly housing. The welding wire feeder also includes a shaft coupled to and extending from the motor and a feed roll configured to rotate with respect to the wire drive assembly housing. Further, the welding wire feeder includes a drive mechanism configured to couple with the shaft and to urge rotation of the second feed roll as the motor rotates the shaft. The drive mechanism is configured to adjust a position of the feed roll along an axis of the shaft.

In a further embodiment, a welding wire feeder drive shaft assembly includes a shaft configured to couple with a motor drive of a welding wire feeder. The welding wire feeder drive shaft assembly also includes a drive mechanism configured to engage a feed roll to drive rotation of the feed roll, where the rotation of the feed roll feeds welding wire through the welding wire feeder. The drive mechanism facilitates an axial adjustment of the feed roll along an axis the shaft.

DRAWINGS

These and other features, aspects, and advantages of the present disclosure will become better understood when the following detailed description is read with reference to the accompanying drawings in which like characters represent like parts throughout the drawings, wherein:

FIG. 8 is a cross sectional view of an embodiment of the wire feeder of FIG. 3; and FIG. 9 is a cross sectional view of an embodiment of the wire feeder of FIG. 3.

DETAILED DESCRIPTION

Embodiments of the present disclosure are directed to systems including an adjustable drive shaft assembly for use in a welding wire feeder. The drive shaft assembly may be adjusted to maintain a feed roll in a desired position along the shaft that holds the feed roll within the welding wire feeder. This allows a user to change a position of the feed roll so that a groove in the feed roll used to carry the welding wire is aligned with other wire feeder components. In addition to allowing position adjustment of the feed roll, the drive shaft assembly may allow for simple insertion and removal of the feed roll, without readjusting the drive shaft assembly. The drive shaft assembly may include a drive mechanism that engages with and urges rotation of the feed roll as a motor rotates the drive shaft assembly. Consequently, the disclosed embodiments enable a user to ensure proper alignment of wire feeder components throughout their use, e.g., to correct for any misalignment due to initial manufacture or assembly of the wire feeder. Such proper alignment may allow self-threading of the wire feeder as well as increased efficiency in changing out the feed rolls.

Figure 1:
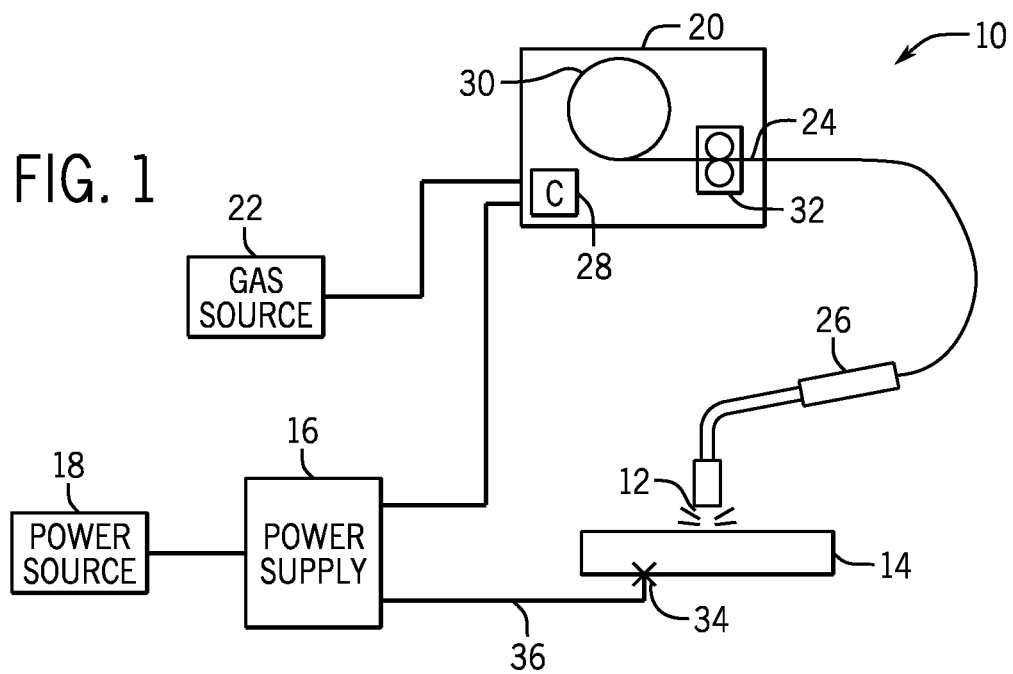
FIG. 1 is a block diagram of an embodiment of a welding system utilizing a wire feeder that may include an adjustable drive shaft assembly.

Turning now to the figures, FIG. 1 is a block diagram of an embodiment of a welding system 10 in accordance with present techniques. The welding system 10 is designed to produce a welding arc 12 on a work piece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding wire 24 is fed through the welding torch 26 to the welding arc 12, molten by the welding arc 12, and deposited on the work piece 14.

The wire feeder 20 will typically include control circuitry, illustrated generally by reference numeral 28, which regulates the feed of the welding wire 24 from a spool 30, and commands the output of the power supply 16. The spool 30 will contain a length of welding wire 24 that is consumed during the welding operation. The welding wire 24 is advanced by a wire drive assembly 32, typically through the use of an electric motor under control of the control circuitry 28. In addition, the work piece 14 is coupled to the power supply 16 by a clamp 34 connected to a work cable 36 to complete an electrical circuit when the welding arc 12 is established between the welding torch 26 and the work piece 14.

Placement of the welding torch 26 at a location proximate to the work piece 14 allows electrical current, which is provided by the power supply 16 and routed to the welding torch 26, to arc from the welding torch 26 to the work piece 14. As described above, this arcing completes an electrical circuit that includes the power supply 16, the welding torch 26, the work piece 14, and the work cable 36. Particularly, in operation, electrical current passes from the power supply 16, to the welding torch 26, to the work piece 14, which is typically grounded back to the power supply 16. The arcing generates a relatively large amount of heat that causes part of the work piece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Figure 2:
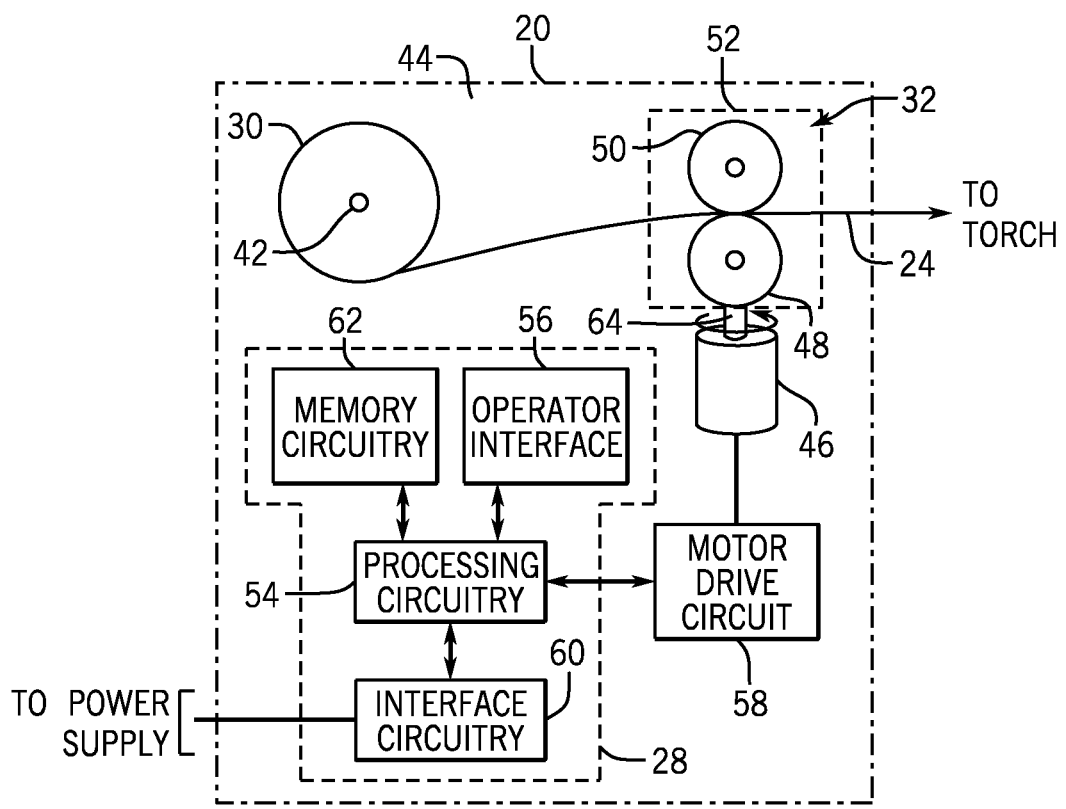
FIG. 2 is a block diagram of an embodiment of the wire feeder of FIG. 1, having an adjustable drive shaft assembly.

FIG. 2 is a block diagram of an embodiment of certain components of the wire feeder 20 of FIG. 1. As previously described, in certain embodiments, the welding wire 24 is supplied from the spool 30, which may be mounted via a spool mount 42 onto an inner wall 44 of the wire feeder 20. The wire drive assembly 32 facilitates progressive feeding of the welding wire 24 from the spool 30 to the welding torch 26 at a desired rate for the welding application. A motor 46 is provided that engages with two feed rolls 48 and 50 to push the welding wire 24 from the wire feeder 20 toward the welding torch 26. In an embodiment, one of the feed rolls (i.e., a drive roll) 48 is mechanically coupled to the motor 46 and is rotated by the motor 46 to drive the welding wire 24 from the wire feeder 20, while the mating feed roll (i.e., an idler roll) 50 is biased toward the welding wire 24 to maintain contact between the two feed rolls 48 and 50 and the welding wire 24. In other embodiments, both feed rolls 48 and 50 may be driven. The feed rolls 48 and 50 may be supported against a wire drive assembly housing 52, which may be attached to the inner wall 44 of the wire feeder 20. The motor 46 is located relatively adjacent the wire drive assembly housing 52. Both the driven feed roll 48 and the idler feed roll 50 are configured to rotate with respect to the wire drive assembly housing 52. The illustrated embodiment shows one pair of feed rolls 48 and 50; however, the wire feeder 20 may include multiple pairs of such feed rolls in certain contexts. Present embodiments of the wire feeder 20 also include an adjustable drive shaft assembly 64 coupled to the motor 46 and configured to couple with the feed roll 48. The drive shaft assembly 64 may be designed to urge rotation of the feed roll 48 and to adjust a position of the feed roll 48 relative to the wire drive assembly housing 52, as described below.

In addition to mechanical components, the wire feeder 20 includes the control circuitry 28 for controlling the wire feed speed of the welding wire 24 through the wire feeder 20, among other things. In certain embodiments, processing circuitry 54 is coupled to an operator interface 56 on the wire feeder 20 that allows selection of one or more welding parameters, for example, wire feed speed. The operator interface 56 may also allow for selection of such weld parameters as the welding process, the type of welding wire 24 utilized, current, voltage or power settings, and so forth. The processing circuitry 54 communicates with the motor 46 via a motor drive circuit 58, allowing control of wire feed speeds in accordance with operator selections. Additionally, the processing circuitry 54 permits these settings to be fed back to the power supply 16 via interface circuitry 60 and/or stored by appropriate memory circuitry 62 for later use. The control circuitry 28 within the wire feeder 20 may also regulate the flow of shielding gas from the gas source 22 to the welding torch 26. In general, such shielding gas is provided at the time of welding, and may be turned on immediately preceding welding and for a short time following welding.

Figure 3:
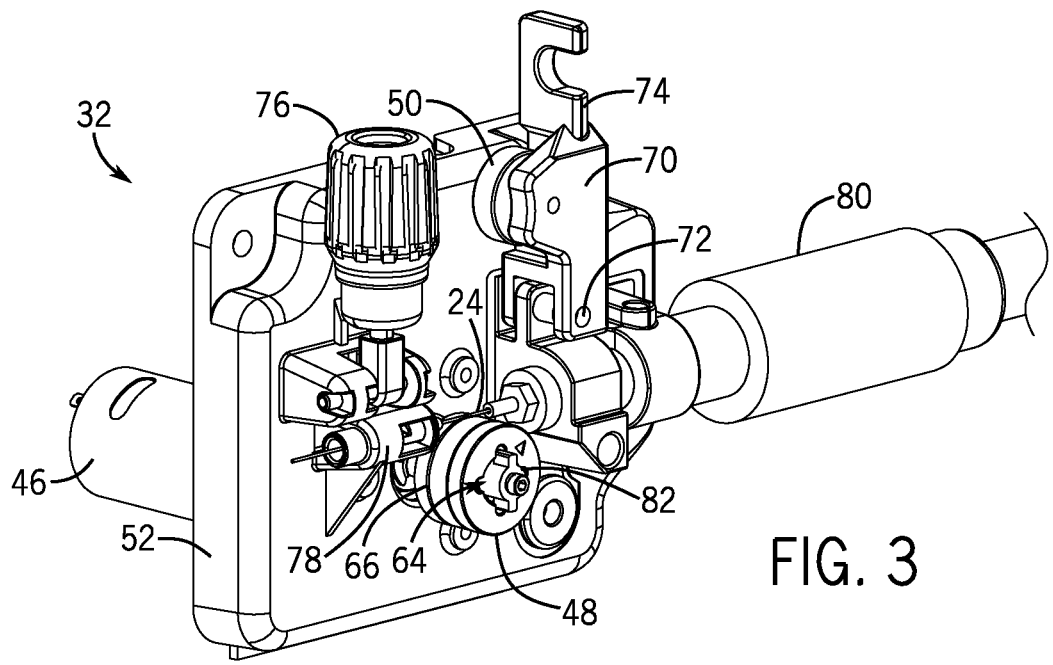
FIG. 3 is a perspective view of an embodiment of certain components of the wire feeder of FIG. 2.

FIG. 3 is a perspective view of an embodiment of certain components of the wire feeder 20, including the drive assembly 32 that feeds welding wire 24 toward a welding application. The feed roll 48 includes a groove 66 for the driven welding wire 24 to nest in, and the opposing feed roll 50 applies a force to the welding wire 24 to provide traction between the welding wire 24 and the feed roll 48. In some embodiments, the feed roll 50 may include a groove as well, which should be aligned with the groove 66 to properly feed the welding wire 24. As illustrated, the feed roll 50 may be mounted on a clamp arm 70, which pivots about one end 72 and may be forced downward at an opposite end 74 by a tensioner 76. In the illustrated embodiment, the clamp arm 70 is positioned such that the drive assembly 32 is not operating in a wire feeding mode. Once the clamp arm 70 is lowered, through, the tensioner 76 may be turned to adjust the compressive force applied to the welding wire 24 between the feed rolls 48 and 50. A desired compressive force may be determined based on the diameter and material properties of the welding wire 24 (e.g., steel versus aluminum welding wire). As previously mentioned, the feed roll 48 may be rotated via the drive shaft assembly 64 coupled to the motor 46, and this rotation ultimately moves the welding wire 24 through the wire feeder 20.

When feeding the welding wire 24 through the wire feeder 20, it is generally beneficial to maintain a precise alignment of components within the wire drive assembly 32. For example, the center of an inlet wire guide 78 may be aligned with a torch connection 80 that serves as an outlet of the wire drive assembly 32. In addition, the feed roll 48 should be positioned such that the groove 66 is aligned with the inlet wire guide 78 and the torch connection 80. This alignment should be to within less than one wire diameter. This may enable an operator to self-thread the welding wire 24 into the wire drive assembly 32 without having to separate the feed rolls 48 and 50 by lifting the clamp arm 70. The operator may simply insert the welding wire 24 into the inlet wire guide 78, and the groove 66 forms the only space through which the welding wire 24 may enter. The welding wire 24 may become lodged within the groove 66 of the feed roll 48, and pushed toward the torch connection 80, which then guides the welding wire 24 toward the welding torch 26 or another welding application.

In order to maintain a desired alignment of the groove 66 with other internal drive components, present embodiments of the drive shaft assembly 64 are configured to facilitate an adjustment of a position of the feed roll 48 relative to the wire drive assembly housing 52. That is, the drive shaft assembly 64 may be adjusted to position the feed roll 48 along an axis of the drive shaft assembly 64. To that end, the illustrated embodiment of the drive shaft assembly 64 includes a drive mechanism 82 that is adjustable along a length of a shaft extending from the motor 46. The feed roll 48 may be biased against the drive mechanism 82 (e.g., via a spring) so that the position of the feed roll 48 is adjusted by changing a position of the drive mechanism 82 along the shaft. Positioning the feed roll 48 in this manner may align the groove 66 with the inlet wire guide 78 and the torch connection 80. Again, in some embodiments, positioning the feed roll 48 may align the groove 66 with an opposing groove in the feed roll 50 as well. As a result, the wire feeder 20 may perform more effectively than would be possible with misaligned feed rolls.

Figure 4:
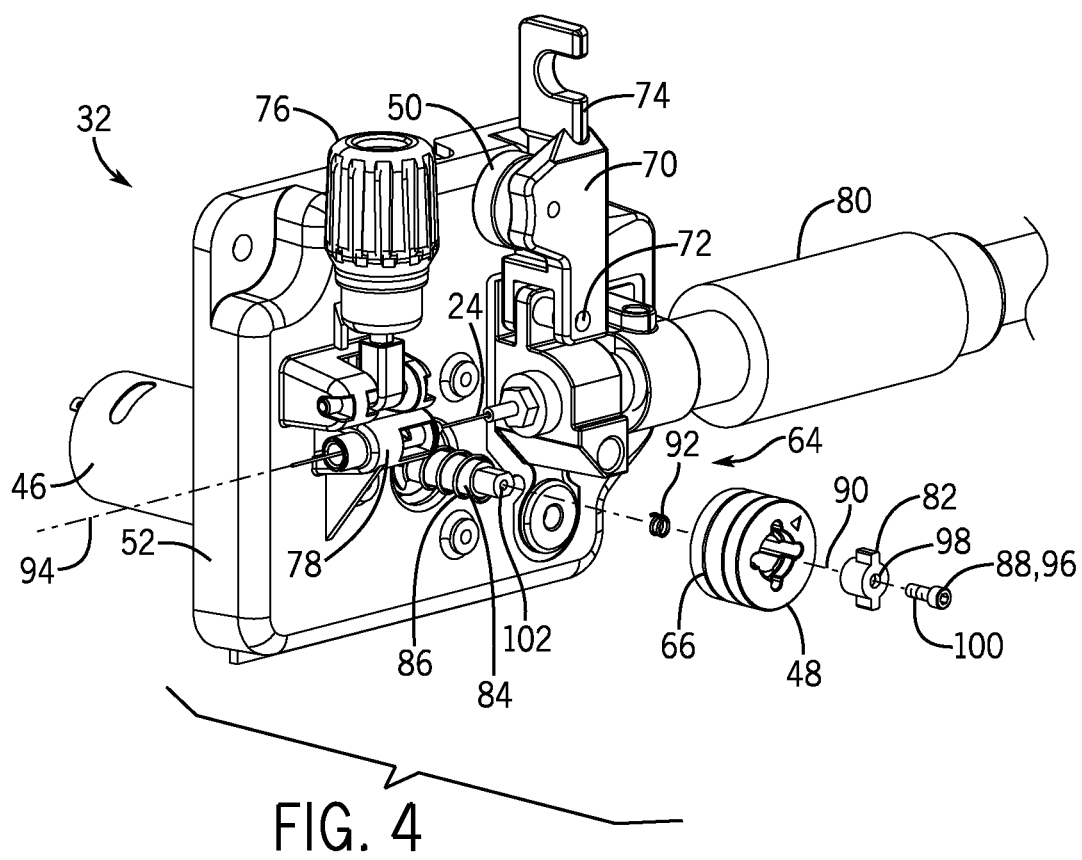
FIG. 4 is an exploded perspective view of an embodiment of the wire feeder of FIG. 3.

FIG. 4 is an exploded perspective view of an embodiment of the wire drive assembly 32 of FIG. 3, showing in greater detail the components of the drive shaft assembly 64. The adjustable drive shaft assembly 64 may include, for example, a shaft 84 extending from the motor 46, and configured to rotate in response to a rotation of the motor 46. In some embodiments, the shaft 84 may be a separate piece that can be coupled with the motor 46, so that the drive shaft assembly 64 may be retrofitted to the wire drive assembly 32. In addition, the adjustable drive shaft assembly 64 may include a spring 86 for biasing the feed roll 48 toward the drive mechanism 82, and a locking mechanism 88 for securing the drive mechanism 82 in a desired axial position along the shaft 84. That is, the drive mechanism 82 can be moved relative to the shaft 84 in a direction of a shaft axis 90, and once the drive mechanism 82 is in proper alignment, the locking mechanism 88 is positioned to lock the drive mechanism 82 in place. A relatively smaller spring 92 may be located between the shaft 84 and the drive mechanism 82 to bias the drive mechanism 82 against the locking mechanism 88. The drive shaft assembly 64 may be adjusted to bring the groove 66 into alignment with a wire feed axis 94 along which the welding wire 24 is directed through the wire feeder 20. The wire feed axis 94 is substantially perpendicular to the shaft axis 90.

In the illustrated embodiment, the locking mechanism 88 includes a screw 96 that may be received through an aperture 98 of the drive mechanism 82 and coupled with the shaft 84. The aperture 98 may be large enough that the screw 96 does not engage the aperture 98. Threads 100 of the screw 96 engage female threads formed in an aperture 102 of the shaft 84. In this way, turning the screw 96 may bring the drive mechanism 82 closer to the shaft 84, thereby positioning the feed roll 48 closer to the wire drive assembly housing 52. Likewise, turning the screw 96 in a direction that loosens the screw 96 moves the drive mechanism 82, and the feed roll 48, away from the wire drive assembly housing 52.

In addition to providing for adjustment of the feed roll 48 relative to the wire drive assembly housing 52, the drive mechanism 82 also may facilitate simple insertion, removal, and rotation of the feed roll 48. For example, as described in greater detail below, the drive mechanism 82 may include protrusions that engage with and urge rotation of the feed roll 48 when the motor 46 rotates the drive shaft assembly 64. By engaging with the feed roll 48 in this way, the drive mechanism 82 enables relatively easy insertion and removal of the feed roll 48 from the drive assembly 32. Specifically, the feed roll 48 may be inserted onto or removed from the drive shaft assembly 64 without making any adjustments to the drive shaft assembly 64 (e.g., removing the drive mechanism 82). In this way, the disclosed drive shaft assembly 64 enables simpler changing out of the feed roll 48 since the drive mechanism 82 does not have to be readjusted along the shaft 84.

Figure 5:
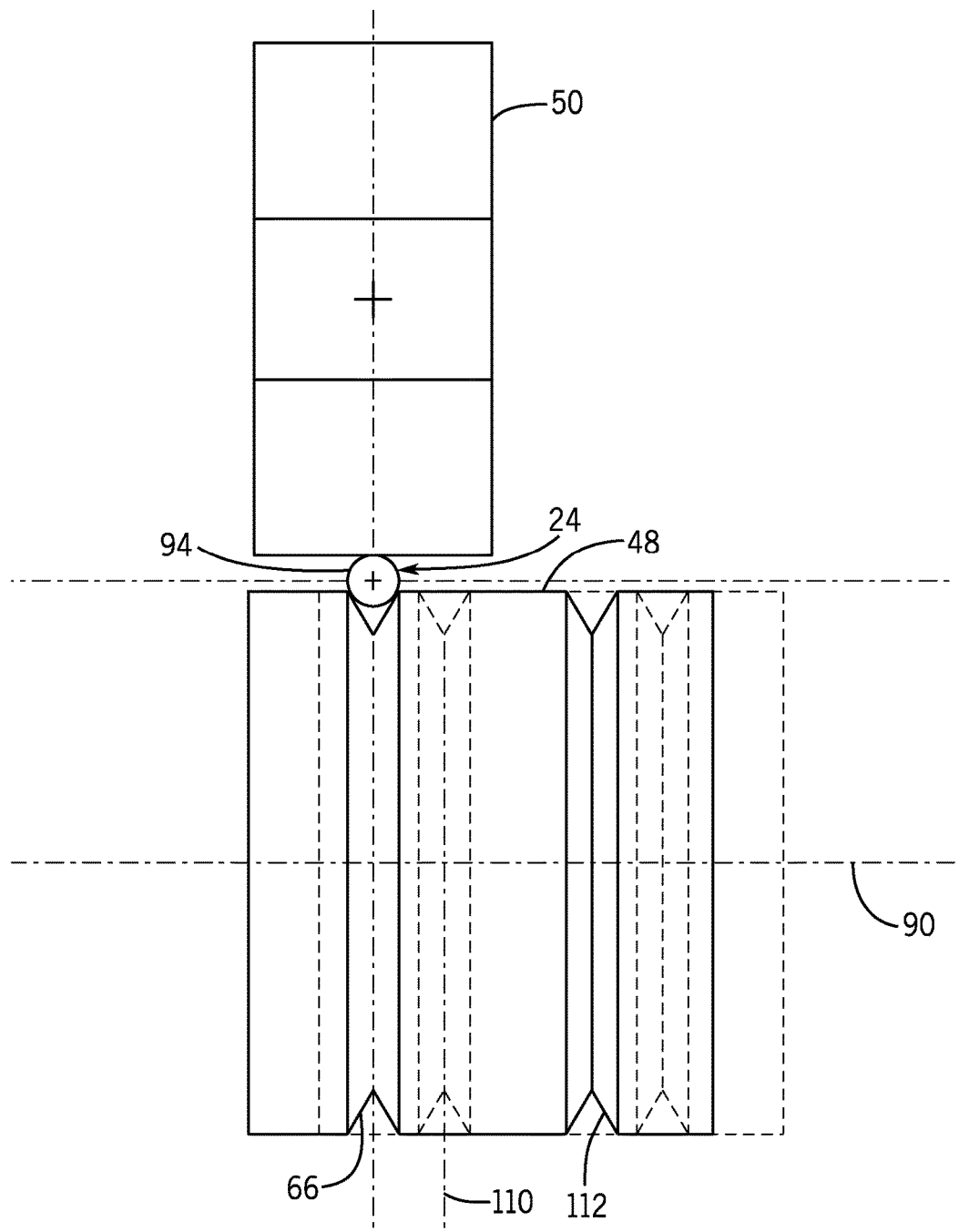
FIG. 5 is a front view of an embodiment of certain components of the wire feeder of FIG. 3.

FIG. 5 is a front view of an embodiment of certain components of the wire drive assembly 32 of FIG. 3, including the feed rolls 48 and 50 and the welding wire 24. As previously described, the drive mechanism 82 may be used to bring the feed roll 48 into alignment with other internal components of the wire drive assembly 32 (e.g., the inlet wire guide 78 and the torch connection 80). FIG. 5 shows how the feed roll 48 may be adjusted so that it is brought into alignment with the wire feed axis 94. The feed roll 48 may initially be positioned along the shaft axis 90 such that the groove 66 is offset from the wire feed axis 94. This offset is illustrated via the dashed representation of the feed roll 48, which shows a centerline 110 of the groove 66 that is offset from the wire feed axis 94 along the shaft axis 90. The drive shaft assembly 64, however, may be utilized to adjust the position of the feed roll 48 along the shaft axis 90, from the out-of-position state (e.g., dashed feed roll) to an inline state (e.g., solid feed roll). Upon completion of this adjustment, the feed roll 48 is positioned such that the centerline 110 of the groove 66 is aligned with the wire feed axis 94.

Different sizes and types of feed rolls 48 may be used interchangeably in the wire feeder 20. These different feed rolls 48 may have respective grooves 66 located at different axial positions (e.g., along the shaft axis 90) of the feed rolls 48. The adjustable drive shaft assembly 64 may compensate for such differences in position of the grooves 66 along different feed rolls 48. Specifically, the drive mechanism 82 may be adjusted along the shaft axis 90 to position the drive roll 48 to align the groove 66 with the wire feed axis 94, no matter where along the drive roll 48 the groove 66 is located.

Figure 6:
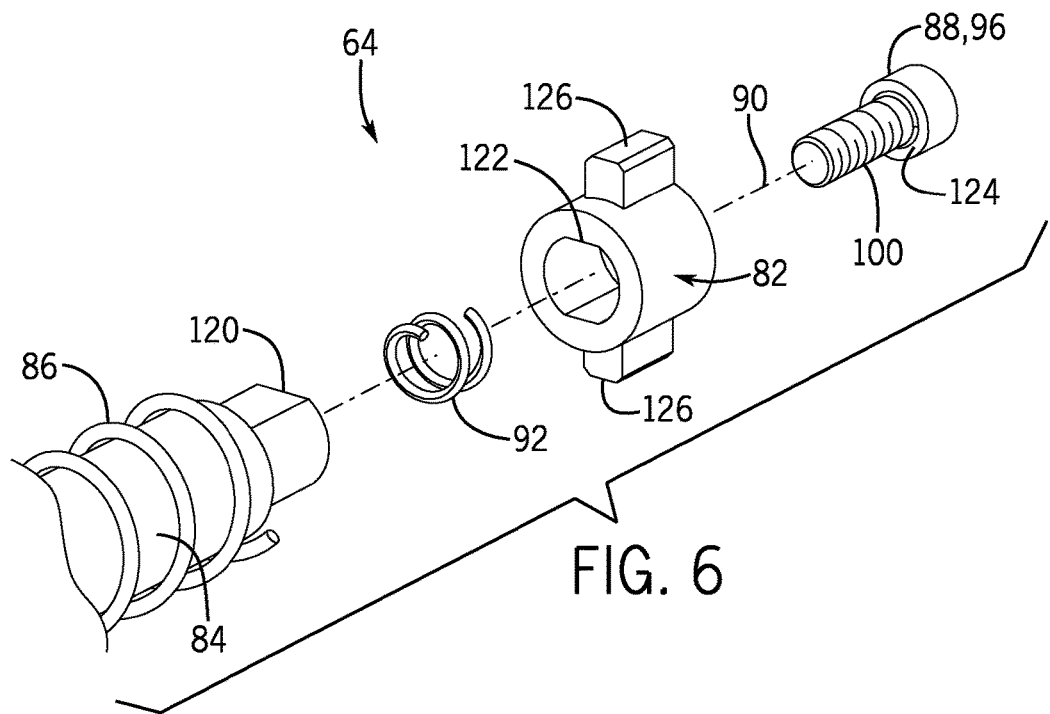
FIG. 6 is an exploded view of an embodiment of the adjustable drive shaft assembly of FIG. 2.

FIG. 6 is an exploded view, along the shaft axis 90, of the drive shaft assembly 64 of FIG. 4. In this embodiment, the shaft 84 includes a shaped end 120 having a specific cross-sectional shape. This cross-sectional shape may be different from the cross-section of the rest of the shaft 84. This shaped end 120 is designed to receive the drive mechanism 82 for transferring rotation from the shaft 84 to the drive mechanism 82. The drive mechanism 82 may include a hollowed out portion with a cross section 122 substantially similar or equal to that of the shaped end 120. The shaped end 120 generally extends in a direction of the shaft axis 90 so that the drive mechanism 82 may be positioned over the shaped end 120 and slide axially along the shaped end 120 of the shaft 84. In this way, the position of the drive mechanism 82 along the shaft 84 may be adjusted.

The spring 92 may be disposed inside the hollowed portion of the drive mechanism 82, between a normal surface of the shaped end 120 and an opposite inner wall of the drive mechanism 82. In certain embodiments, the spring 92 may be disposed around the threads 100 of the screw 96 used to lock the drive mechanism 82 in position relative to the shaft 84. As the screw 96 engages with the shaft 84, an abutment surface 124 of the screw 96 forces the drive mechanism 82 toward the shaft 84. This compresses the spring 92 to bias the drive mechanism 82 toward the abutment surface 124 so that the drive mechanism 82 is maintained in a desired position between the spring 92 and the screw 96.

In the illustrated embodiment, the shaped end 120 of the shaft 84 is an extrusion having a rounded oblong (e.g., "double d") shape with a smaller cross-sectional area than the circular cross section of the rest of the shaft 84. It should be noted, however, that the shaped end 120 may include any desired cross-sectional shape that is substantially uniform in a direction of the shaft axis 90. In some embodiments, the shaped end 120 may include a cross-section having a larger or smaller area than the cross section of the rest of the shaft 84. The shaped end 120 may have any non-circular cross section, such as a square, triangle, or any other shaped cross section that may impart rotation. The shaped end 120 facilitates a transfer of torque from the rotating shaft 84 to the drive mechanism 82, thereby rotating the drive mechanism 82 about the shaft axis 90. The drive mechanism 82 may include one or more protrusions 126 in a radial direction relative to the shaft axis 90 for engaging the feed roll 48. Therefore, as the shaft 84 transfers rotation to the drive mechanism 82, the drive mechanism 82 urges rotation of the feed roll 48 for feeding the welding wire 24 through the wire feeder 20.

Figure 7:
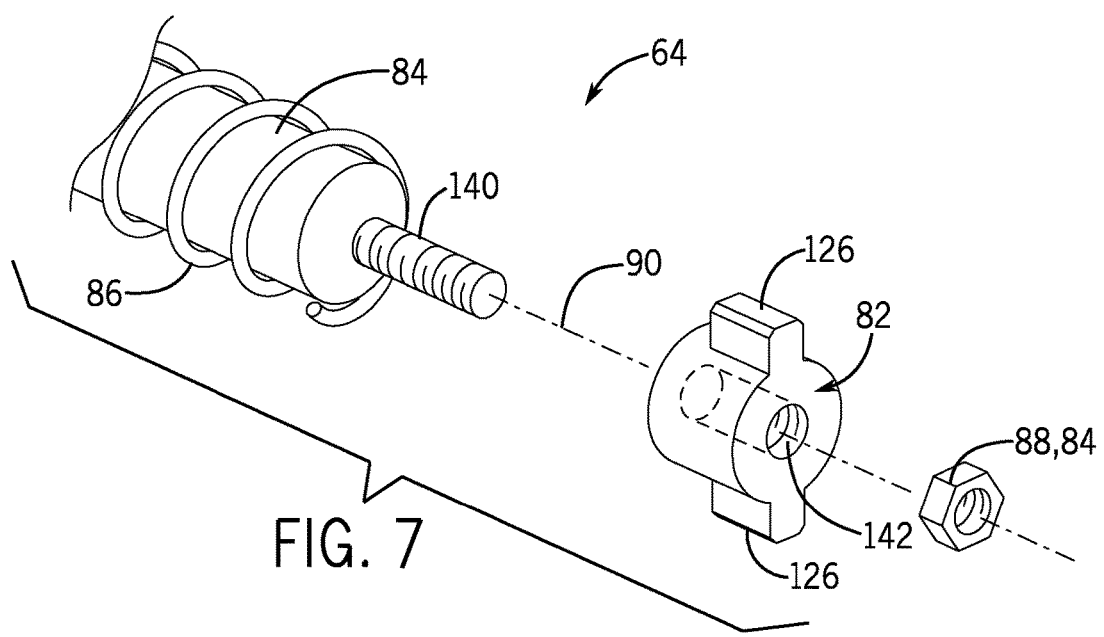
FIG. 7 is an exploded view of an embodiment of the adjustable drive shaft assembly of FIG. 2.

Other combinations of components may be used to form the disclosed drive shaft assembly 64. For example, FIG. 7 is an exploded perspective view of another embodiment of the drive shaft assembly 64 that facilitates an adjustment of the feed roll 48. Similar to the previous embodiment, the illustrated drive shaft assembly 64 includes the drive mechanism 82, shaft 84, spring 86, and locking mechanism 88. However, the shaft 84 and drive mechanism 82 may fit together via a threaded connection, instead of the drive mechanism 82 sliding directly onto the shaft 84. Specifically, the illustrated shaft 84 includes male threads 140, while the drive mechanism 82 includes female threads 142. The position of the drive mechanism 82, and consequently the feed roll 48, can then be adjusted simply by turning the drive mechanism 82 relative to the shaft 84. The locking mechanism 88 includes a jam nut 144 for locking the drive mechanism 82 in place along the threads 140 of the shaft 84. As shown in FIGS. 6 and 7, the drive shaft assembly 64 may include any combination of shaft 84, drive mechanism 82 positioned along the shaft 84, and locking mechanism 88 for securing the drive mechanism 82 in position.

FIGS. 8 and 9 are cross sectional views of an embodiment of certain components of the wire drive assembly 32 of FIGS. 3 and 4. These cross sectional views clearly show the arrangement of the drive shaft assembly 64 as well as how the feed roll 48 is inserted and held onto the drive shaft assembly 64. The drive shaft assembly 64 is assembled such that the screw 96 is engaged with the shaft 84 via the threads 100. The spring 92 biases the drive mechanism 82 against the screw 96 to maintain the drive mechanism 82 in a desired location relative to the shaft 84.

FIG. 8 illustrates the feed roll 48 being initially placed over the drive shaft assembly 64. The feed roll 48 may be generally cylindrical, having an inner diameter large enough to fit around the shaft 84, but not large enough to fit around the protrusions 126. The feed roll 48, however, may also include one or more clearance features (e.g., cavities 150) extending from this inner diameter, and these cavities 150 may fit over the protrusions 126. These cavities 150 do not extend around the entire periphery of the feed roll 48, but instead interrupt an inner portion 151 (shown in FIG. 9) of the feed roll 48 at a set interval (e.g., 90 or 180 degrees about the shaft axis 90). The feed roll 48 may be positioned in a proper orientation (relative to the shaft axis 90) such that the cavities 150 are aligned with the protrusions 126 of the drive mechanism 82, as shown in FIG. 8. The feed roll 48 then is inserted (e.g., arrows 152) over the drive shaft assembly 64. Once the feed roll 48 is advanced past the protrusions 126, the feed roll 48 is rotated (e.g., arrow 154) about the shaft axis 90 until the cavities 150 are no longer in alignment with the protrusions 126. After this, the feed roll 48 is released, as shown in FIG. 9. The spring 86, which was compressed against a washer 156 (or other surface) during initial insertion of the feed roll 48, releases stored energy to force (e.g., arrows 158) the feed roll 48 away from the wire drive assembly housing 52. Since the cavities 150 of the feed roll 48 are no longer aligned with the protrusions 126, the inner portion 151 of the feed roll 48 stops against the drive mechanism 82. From this position, the drive mechanism 82 may engage with the feed roll 48 via the protrusions 126 in order to urge the feed roll 48 to rotate as the motor 46 rotates the drive shaft assembly 64. Because the drive mechanism 82 is properly positioned along the shaft 84 and locked into place via the screw 96, the feed roll 48 is held in place so that the groove 66 is aligned with the wire feed axis 94. The illustrated drive shaft assembly 64 does not need to be readjusted in order to replace the feed roll 48. Instead, as shown, the feed roll 48 may be inserted and/or removed without removing or adjusting the position of the drive mechanism 82.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
 a welding wire feeder, comprising:
  a motor configured to rotate with respect to a wire drive assembly housing; and
  an adjustable drive shaft assembly coupled to the motor and configured to couple with a feed roll;
  wherein the adjustable drive shaft assembly comprises a drive mechanism configured to transfer a rotational force from the motor to the feed roll and to adjust an axial position setting of the feed roll relative to the wire drive assembly housing without rotation of the feed roll during adjustment of the axial position setting, wherein the drive mechanism comprises an axially-adjustable locking mechanism configured to abut the feed roll, and rotation of the axially-adjustable locking mechanism adjusts the axial position setting of the feed roll and the drive mechanism relative to a shaft of the wire drive assembly, wherein the axially-adjustable locking mechanism of the drive mechanism is independently adjustable relative to the feed roll and the shaft of the adjustable drive shaft assembly configured to rotate with the motor, and wherein the axially-adjustable locking mechanism, the shaft, and the feed roll are coaxial with one another.

2. The welding system of claim 1, wherein the drive mechanism is configured to adjust the axial position setting of the feed roll such that a groove in the feed roll is brought into alignment with a wire feed axis.

3. The welding system of claim 1, wherein the drive mechanism is configured to adjust the axial position setting of the feed roll along a shaft axis of the adjustable drive shaft assembly.

4. The welding system of claim 1, wherein the adjustable drive shaft assembly comprises:
 the shaft configured to rotate with the motor; and
 a spring for biasing the feed roll toward the drive mechanism;
 wherein the axially-adjustable locking mechanism is configured to lock the drive mechanism in an axial position along the shaft.

5. The welding system of claim 1, wherein the drive mechanism comprises a protrusion configured to engage and urge rotation of the feed roll when the motor rotates the adjustable drive shaft assembly.

6. The welding system of claim 1, wherein the drive mechanism is axially between the feed roll and the axially-adjustable locking mechanism.

7. The welding system of claim 4, wherein the shaft comprises a shaped end configured to receive the drive mechanism, and the axially-adjustable locking mechanism comprises a screw configured to be received through an aperture in the drive mechanism and to be coupled with the shaft.

8. The welding system of claim 7, wherein the adjustable drive shaft assembly comprises a spring for biasing the drive mechanism toward an abutment surface of the screw.

9. The welding system of claim 4, wherein the drive mechanism is configured to be threaded onto an end of the shaft, and the axially-adjustable locking mechanism comprises a nut for locking the drive mechanism in place.

10. A welding wire feeder, comprising:
a wire drive assembly housing;
a motor disposed adjacent the wire drive assembly housing;
a shaft coupled to and extending from the motor;
a feed roll configured to rotate with respect to the wire drive assembly housing; and
a drive mechanism configured to couple with the shaft and to transfer rotation of the shaft to the feed roll and to adjust an axial position setting of the feed roll along the shaft without rotation of the feed roll, wherein the drive mechanism comprises an axially-adjustable locking mechanism configured to abut the feed roll, and rotation of the axially-adjustable locking mechanism adjusts the axial position setting of the feed roll and the drive mechanism relative to the shaft, wherein the axially-adjustable locking mechanism of the drive mechanism is independently adjustable relative to the feed roll and the shaft, and wherein the axially-adjustable locking mechanism, the shaft, and the feed roll are coaxial with one another.

11. The welding wire feeder of claim 10, wherein the feed roll is configured to be inserted onto or removed from the shaft without adjusting an axial position of the drive mechanism.

12. The welding wire feeder of claim 10, wherein the feed roll comprises a groove for receiving welding wire, and the drive mechanism is configured to position the feed roll to align the groove with a wire feed axis.

13. The welding wire feeder of claim 10, wherein the axially-adjustable locking mechanism is configured to lock the drive mechanism in place along the shaft.

14. The welding wire feeder of claim 13, wherein the shaft comprises a shaped end configured to receive the drive mechanism, and the axially-adjustable locking mechanism comprises a screw configured to be received through an aperture in the drive mechanism and to be coupled with the shaft.

15. The welding wire feeder of claim 13, wherein the drive mechanism is configured to be threaded onto an end of the shaft, and the axially-adjustable locking mechanism comprises a nut for locking the drive mechanism in place.

16. A welding wire feeder drive shaft assembly, comprising:
a shaft configured to couple with a motor drive of a welding wire feeder; and
a drive mechanism configured to engage a feed roll to drive rotation of the feed roll, wherein the rotation of the feed roll feeds welding wire through the welding wire feeder;
wherein the drive mechanism facilitates an adjustment of an axial position setting of the feed roll along the shaft without rotation of the feed roll during the adjustment of the axial position setting, wherein the drive mechanism comprises an axially-adjustable locking mechanism configured to abut the feed roll, and rotation of the axially-adjustable locking mechanism adjusts the axial position setting of the feed roll and the drive mechanism relative to the shaft, wherein the axially-adjustable locking mechanism of the drive mechanism is independently adjustable relative to both the feed roll and the shaft, and wherein the axially-adjustable locking mechanism, the shaft, and the feed roll are coaxial with one another.

17. The welding wire feeder drive shaft assembly of claim 16, wherein the feed roll is configured to be inserted onto or removed from the welding wire feeder drive shaft assembly without adjusting a position of the drive mechanism.

18. The welding wire feeder drive shaft assembly of claim 16, comprising:
a spring disposed about the shaft and configured to bias the feed roll toward the drive mechanism, wherein the axially-adjustable locking mechanism is configured to lock the drive mechanism into an axial position along the shaft.

19. The welding wire feeder drive shaft assembly of claim 18, wherein the shaft comprises a shaped end configured to receive the drive mechanism, and the axially-adjustable locking mechanism comprises a screw configured to be received through an aperture in the drive mechanism and to be coupled with the shaft.

20. The welding wire feeder drive shaft assembly of claim 18, wherein the drive mechanism is configured to be threaded onto an end of the shaft, and the axially-adjustable locking mechanism comprises a nut for locking the drive mechanism in place.

* * * * *